United States Patent
Patel et al.

(10) Patent No.: US 10,218,460 B2
(45) Date of Patent: Feb. 26, 2019

(54) SYSTEM AND METHOD FOR IMPROVED PUSH-TO-TALK COMMUNICATION PERFORMANCE

(71) Applicant: Kodiak Networks Inc., Plano, TX (US)

(72) Inventors: Krishnakant M Patel, Richardson, TX (US); Brahmananda R Vempati, Dallas, TX (US); Harisha Mahabaleshwara Negalaguli, Richardson, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 15/287,534

(22) Filed: Oct. 6, 2016

(65) Prior Publication Data

US 2017/0099587 A1    Apr. 6, 2017

Related U.S. Application Data

(60) Provisional application No. 62/237,965, filed on Oct. 6, 2015, provisional application No. 62/273,271, filed on Dec. 30, 2015.

(51) Int. Cl.
*H04W 4/10* (2009.01)
*H04L 1/00* (2006.01)
(Continued)

(52) U.S. Cl.
CPC .......... *H04L 1/0026* (2013.01); *H04L 1/0029* (2013.01); *H04L 67/42* (2013.01);
(Continued)

(58) Field of Classification Search
CPC .................................. H04W 4/10; H04L 5/16
(Continued)

(56) References Cited

U.S. PATENT DOCUMENTS 3,912,874 A    10/1975    Botterell et al.
4,796,293 A    1/1989    Blinken et al.
(Continued)

FOREIGN PATENT DOCUMENTS

WO    00069189    11/2000
WO    0079825 A1    12/2000
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — John J Lee

(57) ABSTRACT

A system and method for improved push-to-talk (PTT) communications performance includes a PTT application server receiving a request from a client user equipment (UE) device to access PTT services over a carrier network. The PTT application server measures, determines, predicts, or otherwise detects congestion in a cell of the carrier network servicing the client UE device. In a representative aspect responsive to detecting a value of congestion, the PTT server modifies one or more PTT call parameters, transmits a modified PTT call parameter to the UE device, and reduces the number of signals subsequently transmitted to the UE device. The modified PTT call parameter may be a codec selection for encoding/decoding PTT voice data. Subsequently transmitted signals may include acknowledgement signals, retry requests, bundled frames, or the like.

23 Claims, 5 Drawing Sheets

(51) Int. Cl.
*H04L 29/06* (2006.01)
*H04W 4/02* (2018.01)
*H04W 28/02* (2009.01)
*H04W 88/02* (2009.01)
*H04W 84/08* (2009.01)

(52) U.S. Cl.
CPC ............ *H04W 4/02* (2013.01); *H04W 4/10* (2013.01); *H04W 28/0284* (2013.01); *H04W 84/08* (2013.01); *H04W 88/02* (2013.01)

(58) Field of Classification Search
USPC .................. 455/517, 518, 519, 520, 452.1
See application file for complete search history.

(56) References Cited

U.S. PATENT DOCUMENTS

| | | | |
|---|---|---|---|
| 5,212,832 A * | 5/1993 | Ness-Cohn | H04W 4/10 455/514 |
| 5,293,449 A | 3/1994 | Tzeng | |
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 6/2006 | Chaturvedi et al. | |
| 7,082,316 B2 | 7/2006 | Elden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskj | |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,670,760 B2 | 3/2014 | Lawler et al. | |
| 8,676,189 B2 | 3/2014 | Lawler et al. | |
| 8,913,494 B2 | 12/2014 | Marupaduga et al. | |
| 9,282,130 B1 | 3/2016 | Goepp | |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0121760 A1 | 6/2004 | Wetman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0255811 A1 | 11/2005 | Allen et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0067499 A1 | 3/2006 | Oliveira et al. | |
| 2006/0078064 A1 | 4/2006 | Schmidt et al. | |
| 2006/0094455 A1 | 5/2006 | Hannu et al. | |
| 2006/0116150 A1 | 6/2006 | Bhutiani | |
| 2006/0128411 A1 | 6/2006 | Turcanu | |
| 2006/0178138 A1 | 8/2006 | Ostroff et al. | |
| 2006/0189337 A1 | 8/2006 | Farrill et al. | |
| 2006/0198334 A1 | 9/2006 | Civanlar et al. | |
| 2006/0229090 A1 | 10/2006 | Ladue | |
| 2006/0234687 A1 | 10/2006 | Patel et al. | |
| 2007/0037562 A1 | 2/2007 | Smith-Kerker et al. | |
| 2007/0037597 A1 | 2/2007 | Biswas et al. | |
| 2007/0037598 A1 | 2/2007 | Ayyasamy et al. | |

(56) References Cited

U.S. PATENT DOCUMENTS

| | | |
|---|---|---|
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |
| 2007/0154005 A1 | 7/2007 | Daigle |
| 2007/0177602 A1 | 8/2007 | Pichelin et al. |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0159128 A1 | 7/2008 | Shaffer et al. |
| 2008/0299953 A1 | 12/2008 | Rao |
| 2009/0080356 A1 | 3/2009 | Song et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0161590 A1* | 6/2009 | Lewis ................ H04L 12/1836 370/312 |
| 2009/0209235 A1 | 8/2009 | Lawler et al. |
| 2009/0279512 A1 | 11/2009 | Fujishima et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0197335 A1 | 8/2010 | Jin et al. |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0026947 A1 | 2/2012 | Miller et al. |
| 2012/0278496 A1 | 11/2012 | Hsu |
| 2013/0021933 A1 | 1/2013 | Kowali et al. |
| 2013/0021965 A1 | 1/2013 | Chu et al. |
| 2013/0084911 A1 | 4/2013 | Chang |
| 2013/0136025 A1 | 5/2013 | Li et al. |
| 2013/0155875 A1 | 6/2013 | Ayyasamy et al. |
| 2013/0196706 A1 | 8/2013 | Patel et al. |
| 2013/0272436 A1 | 10/2013 | Makhlouf et al. |
| 2013/0315164 A1 | 11/2013 | Arur et al. |
| 2013/0337859 A1 | 12/2013 | Patel et al. |
| 2014/0056220 A1 | 2/2014 | Poitau et al. |
| 2014/0078898 A1 | 3/2014 | Anchan et al. |
| 2014/0133443 A1 | 5/2014 | Malladi et al. |
| 2014/0148210 A1 | 5/2014 | Kundu et al. |
| 2014/0219083 A1 | 8/2014 | Mandyam et al. |
| 2014/0219255 A1 | 8/2014 | Eyuboglu et al. |
| 2014/0226746 A1 | 8/2014 | Ko et al. |
| 2014/0274080 A1 | 9/2014 | Gilbert et al. |
| 2015/0078295 A1 | 3/2015 | Mandyam et al. |
| 2015/0085797 A1 | 3/2015 | Ji et al. |
| 2015/0092704 A1 | 4/2015 | Chen |
| 2015/0117347 A1 | 4/2015 | Iwai |
| 2015/0163039 A1 | 6/2015 | Davydov et al. |
| 2015/0173107 A1 | 6/2015 | Newberg et al. |
| 2015/0365961 A1 | 12/2015 | Strasman |
| 2016/0269945 A1 | 9/2016 | Jang |
| 2016/0277992 A1* | 9/2016 | Cao ........................ H04W 48/18 |

FOREIGN PATENT DOCUMENTS

| | | |
|---|---|---|
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2014169461 A1 | 10/2014 |
| WO | 2015105970 A1 | 7/2015 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

* cited by examiner

SYSTEM AND METHOD FOR IMPROVED PUSH-TO-TALK COMMUNICATION PERFORMANCE

CROSS REFERENCE TO RELATED APPLICATIONS

This application claims the benefit of U.S. Provisional Application No. 62/237,965, filed on 6 Oct. 2015 and U.S. Provisional Application No. 62/273,271, filed on 30 Dec. 2015, which applications are hereby incorporated herein by reference.

TECHNICAL FIELD

The present disclosure generally relates to communications over telecommunications networks; and in particular embodiments, to techniques and mechanisms for improving push-to-talk (PTT) call performance in a long-term evolution (LTE) carrier network.

BACKGROUND

PTT platforms provide PTT functionality (e.g., call group management, call origination, call transmittal, talk-back call termination, floor management, filtering, etc.) to client user equipment (UE) devices. PTT functions may be implemented by one or more PTT application servers. Communications between client UE devices and a PTT application server may be performed over a carrier network.

BRIEF DESCRIPTION OF THE DRAWINGS

For a more complete understanding of the present disclosure, and representative embodiments thereof, reference is made to the following description taken in conjunction with the accompanying drawing, in which.

Corresponding numerals and symbols in the different figures generally refer to corresponding parts, unless otherwise indicated. The Figures are drawn to representatively illustrate relevant aspects of various embodiments, and are not necessarily drawn to scale.

SUMMARY

Figure 1:
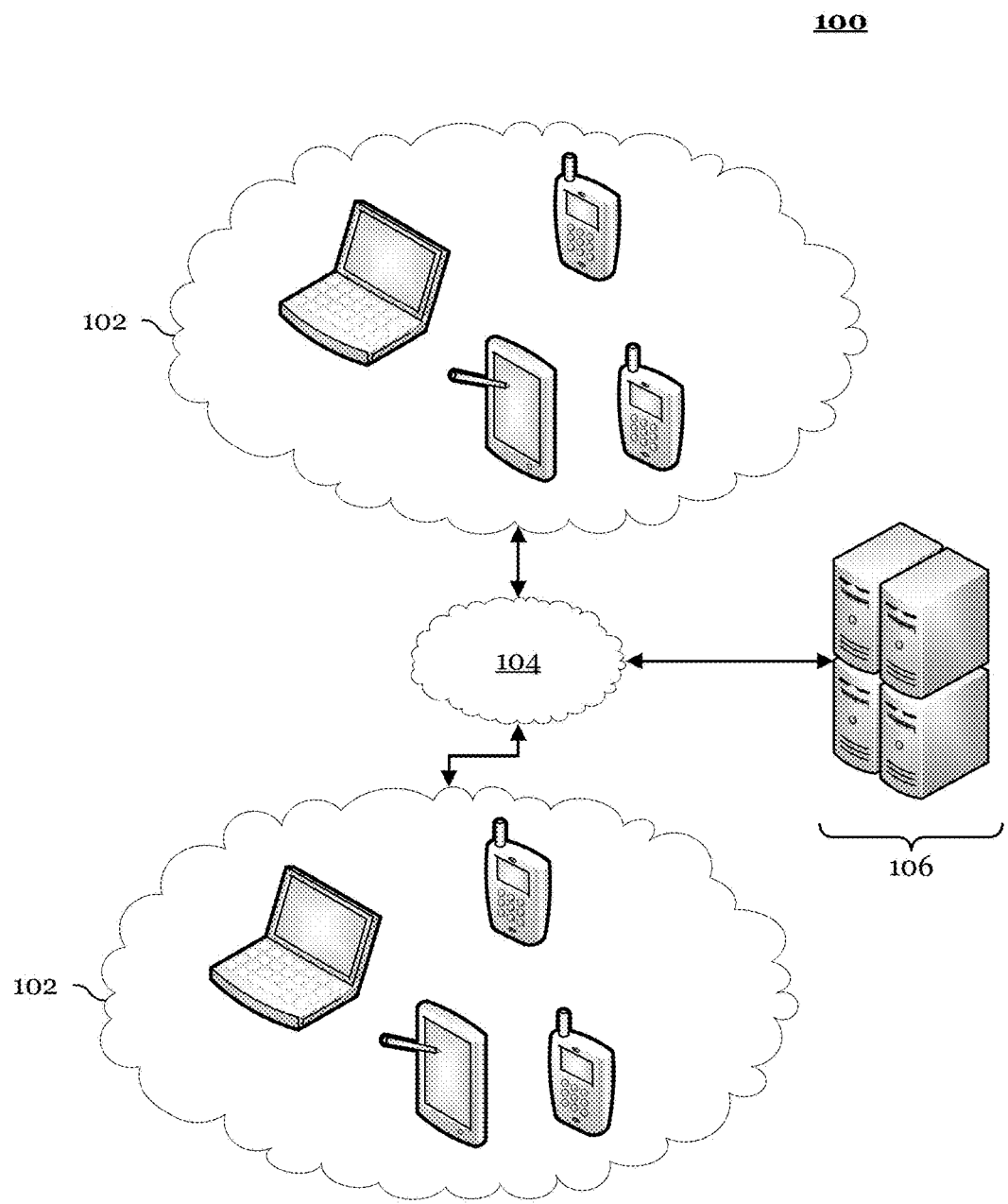
FIG. 1 is a diagram representatively illustrating a telecommunications system, in accordance with an embodiment.

A system of one or more computers can be configured to perform particular operations or actions by virtue of having software, firmware, or hardware (or a combination thereof) installed on the system that in operation directly or indirectly cause the system to perform the actions. One or more computer programs can be configured to perform particular operations or actions by virtue of including instructions that, when executed by one or more data processing apparatuses, cause the apparatus to perform the actions. One general aspect includes a push-to-talk (PTT) application server including one or more processors and a non-transitory, computer-readable medium storing programming executable by the one or more processors. The programming includes instructions to receive a request from a user equipment (UE) device to access the PTT application server, detect radio access network (RAN) congestion, and in response to detecting ran congestion, modify one or more PTT call parameters. The PTT server transmits according to the modified one or more PTT call parameters to the UE device. Other embodiments of this aspect include corresponding computer systems, apparatuses, and computer programs recorded on one or more computer storage devices, each configured to perform the actions of the methods.

Representative implementations may include one or more of the following features. Transmitting according to the modified one or more PTT call parameters may include reducing a number of signals transmitted to the UE device. Signals transmitted to the UE device may include at least one of acknowledgement signals or retry packets. One or more PTT call parameters may include at least one of a codec selection, connected state instantiation, or a frame bundling protocol. Modifying the codec selection may include selecting a lower data rate codec. The lower data rate codec may include AMBE/IMBE 2.69 kbps. Determining RAN congestion may further include using location information for the UE device and use data for a cell in which the UE device is located. Location information for the UE device may be determined from a terminal identifier for the UE device. Use data for the cell may be accessed from a data store external to the PTT application server. Transmitting fewer signals to the UE device may include reducing a number of transmitted acknowledgement signals. A target value for the number of transmitted acknowledgement signals may be determined or predicted based on heuristic analysis of RAN congestion for the cell. Transmitting fewer signals to the UE device may include frame bundling. A target value for frame bundling may be determined based on heuristic analysis of RAN congestion for the cell. Modifying one or more PTT call parameters may include selecting a lower data rate codec. The lower data rate codec may be selected based on heuristic analysis of RAN congestion for the cell. Representative methods may further include determining a measure of congestion for a cell in which the UE device is located, and in response to detecting or predicting threshold congestion in the cell, transmitting the codec call parameter to the UE device, where determining the measure of congestion includes using location information for the UE device and use data for the cell. The method may further include, in response to detecting or predicting threshold congestion, transmitting fewer signals to the UE device. Transmitting fewer signals to the UE device may include at least one of reducing a number of transmitted acknowledgement signals, or frame bundling. The method may further include the PTT application server delaying transmission of PTT data to the first UE device or piggy-backing PTT data for the first UE device on PTT traffic transmitted to a second UE device. Implementations of the described techniques may include hardware, a method or process, or computer software on a computer-accessible medium.

General aspects relate to a method including: receiving, by a PTT application server, a request from a UE device to access the PTT application server; determining or predicting, by the PTT application server, RAN congestion in a carrier network connecting the UE device to the PTT application server; and in response to detecting or predicting RAN congestion, the PTT application server: modifying one or more PTT call parameters; transmitting the modified one or more PTT call parameters to the UE device; and transmitting fewer signals to the UE device. Other embodiments of this aspect include corresponding computer systems, apparatuses, and computer programs recorded on one or more computer storage devices, each configured to perform the actions of the methods.

Representative implementations may include one or more of the following features. Determining or predicting RAN congestion may further include using location information for the UE device and use data for a cell in which the UE device is located. Location information for the UE device may be determined from a terminal identifier for the UE device. Use data for the cell may be accessed from a data store external to the PTT application server. Transmitting fewer signals to the UE device may include reducing a number of transmitted acknowledgement signals. A target value for the number of transmitted acknowledgement signals may be determined based on heuristic analysis of RAN congestion for the cell. Transmitting fewer signals to the UE device may include frame bundling. A target value for frame bundling may be determined based on heuristic analysis of RAN congestion for the cell. Modifying one or more PTT call parameters may include selecting a lower data rate codec. A lower data rate codec may be selected based on heuristic analysis of RAN congestion for the cell. The method may further include determining or predicting a measure of congestion for a cell in which the UE device is located, and in response to detecting or predicting threshold congestion in the cell, transmitting a codec call parameter to the UE device, where determining the measure of congestion includes using location information for the UE device and use data for the cell. The method may further include, in response to detecting or predicting threshold congestion, transmitting fewer signals to the UE device. Transmitting fewer signals to the UE device may include at least one of reducing a number of transmitted acknowledgement signals, or frame bundling. The method may further include the PTT application server delaying transmission of PTT data to the first UE device, or piggy-backing PTT data for the first UE device on PTT traffic transmitted to a second UE device. Implementations of the described techniques may include hardware, a method or process, or computer software on a computer-accessible medium.

Other general aspects relate to a method including: receiving, by a PTT application server, PTT call data from a first UE device, the PTT call data encoded with a first codec, the first codec having a first data rate; and the PTT application server transmitting a codec call parameter to the first UE device, the codec call parameter including a second codec having a second data rate, the second data rate less than the first data rate. The method may also include, after transmitting the codec call parameter to the first UE device, receiving, by the PTT application server, PTT call data from the first UE device where the PTT call data is encoded with the second codec. Other embodiments of this aspect include corresponding computer systems, apparatuses, and computer programs recorded on one or more computer storage devices, each configured to perform the actions of the methods.

Representative implementations may include one or more of the following features. The method may further include determining/predicting a measure of congestion for a cell in which the UE device is located, and in response to detecting/predicting threshold congestion in the cell, transmitting the codec call parameter to the UE device, where determining the measure of congestion includes using location information for the UE device and use data for the cell. The method may further include, in response to detecting/predicting congestion, transmitting fewer signals to the UE device. Transmitting fewer signals to the UE device may include at least one of reducing a number of transmitted acknowledgement signals, or frame bundling. The method may further include the PTT application server delaying transmission of PTT data to the first UE device, or piggy-backing PTT data intended for the first UE device on PTT traffic transmitted to a second UE device. Implementations of the described techniques may include hardware, a method or process, or computer software on a computer-accessible medium.

DETAILED DESCRIPTION

The making and using of embodiments are discussed in detail below. It should be appreciated, however, that concepts disclosed herein may be embodied in a variety of contexts, and that the specific embodiments discussed herein are merely illustrative and do not serve to limit the scope of the claims. Furthermore, it should be understood that various changes, substitutions, and alterations can be made herein without departing from the spirit and scope as defined by the appended claims.

A system and method for improving push-to-talk (PTT) communications performance over a long-term evolution (LTE) carrier network is provided in accordance with various representative embodiments. More specifically, LTE network utilization may be optimized, or otherwise improved, for PTT service configurations. LTE bearer traffic used for PTT may be optimized, or otherwise improved, by modifying PTT call parameters for the bearer. In some embodiments, bearer codec selection may be modified, as well as other PTT call parameters (e.g., acknowledgement signaling, retry packet signaling, or the like) to improve PTT communications performance. PTT call parameters may be modified by a PTT application server, e.g., by a PTT platform in a communications network. The parameters may be modified so that a desired performance metric (e.g., quantity of PTT users that may be accommodated within a congested cell, quality of PTT user experience within a congested cell, level of congestion within a cell, or the like) can be achieved.

By evaluating characteristics of PTT service between a PTT application server and one or more UE devices, radio access network (RAN) congestion in a carrier network connecting the UE device to the PTT application server may be reduced without significantly degrading PTT service performance or user experience.

Carrier network congestion occurs when demand for network resources is greater than available network capacity. For wireless carrier networks, effects attendant to congestion depend on the degree of congestion and the type of application service(s) being used. Congestion can result in packets being delayed or possibly dropped. Application service effects range from slower communication to failure of service; both conditions corresponding to degraded user experience. Consequently, carrier network operators invest substantially in network architecture and engineering to reduce congestion where possible; e.g., by deploying more spectrum, installing more cell sites, using more efficient technology, offloading data to other networks, or the like.

Although congestion can occur on uplink, in most networks, downlink traffic significantly exceeds uplink traffic, and is therefore more susceptible to congestion. One approach for addressing congestion is to use quality-of-service (QoS) mechanisms incorporated in LTE. Such mechanisms do not generally increase communication capacity, but by prioritizing traffic, can permit specific applications to operate more reliably—or at least more reliably as compared with other application, even when a particular cell of the carrier network experiences congestion.

Managing QoS is a complex task for carrier network operators. Evaluation of business models and appropriate use schemes is a difficult and involved process. Irrespective of a carrier network operator's approach for addressing network congestion, application services on any carrier network will experience congestion from time-to-time to a greater or lesser extent. Disclosed herein are representative systems and methods for addressing carrier network congestion as may be experience with PTT services in an LTE cellular communications network.

FIG. 1 is a diagram illustrating a representative communications system 100, which provides an architecture for supporting a telecommunications solution (e.g., a push-to-talk (PTT) communications solution) in accordance with some embodiments. Communications system 100 includes client devices 102, communications network 104 (e.g., an LTE carrier network), and telecommunications services platform 106. As used herein, the term "client device" refers to any component, or collection of components, capable of establishing a connection with a communications network; e.g., a user equipment (UE) device, a mobile station (STA), a cellular phone, a tablet, a laptop, or other wired-/wirelessly-enabled devices. Applications reside on client (UE) devices 102 for accessing various functions, such as PTT functions, provided by the telecommunications solution.

Client devices 102 may communicate with telecommunications services platform 106 over communications network 104, which may be accessed by client devices 102 through a cellular network deployed by a carrier, a WiFi network, other types of wireless networks, a wired internet protocol (IP) network, combinations thereof, or the like. Communications network 104 may include one or more components configured to provide wireless or wired network access, such as an enhanced Node B (eNB), a macro-cell, a femtocell, a Wi-Fi access point (AP), combinations thereof, or the like. Furthermore, communications network 104 may operate in accordance with one or more wireless communication protocols; e.g., open mobile alliance (OMA), LTE, LTE advanced (LTE-A), High Speed Packet Access (HSPA), Wi-Fi 802.11a/b/g/n/ac, or the like. In some embodiments, communications network 104 may comprise various other devices; e.g., low power nodes, or the like. Communications network 104 may further include backhaul network components, such as various gateways, routers, controllers, schedulers, or the like.

In an embodiment where telecommunications services platform 106 is a PTT platform, subscribers to a PTT solution (e.g., users operating UE devices 102) may be provisioned onto communications system 100 via interfaces to carriers (e.g., cellular carriers). PTT customers (e.g., enterprises) can administer subscribers to form closed groups for PTT communications. The PTT solution may interface with the carrier, for example, by including connectivity to the carrier's core network, billing interfaces, provisioning interfaces, lawful intercept interfaces, customer care interfaces, or the like. The PTT platform may provide a plurality of PTT functions to client devices 102 through the PTT clients on client devices 102.

In some embodiments, telecommunications services platform 106 uses container technology for virtualization of a telecommunications system architecture, such as, the virtualization of provided PTT services. Representative container technologies may include, e.g., Docker, Rocket, LXD, or the like; although the architecture is not limited to a specific container technology. Virtualization using container technology may allow telecommunications services platform 106 to adopt a micro-services model in which service clusters may be considered building blocks of the system architecture. For example, each function provided by telecommunications services platform 106 may be virtualized in a separate service cluster, and each service cluster may perform a different function in telecommunications services platform 106. Service clusters may be hosted on virtual machines of a representative cloud network. In an embodiment, a cloud network may include a plurality of geographically diverse deployment sites (e.g., data centers) where various virtual machines may be physically deployed. Decomposition of the system into a set of services allows each service (e.g., each function provided by the telecommunications services platform) to be substantially independently deployed and managed. System resilience may thereby be improved as failures may be localized to individual services. Furthermore, rapid and agile deployment of services may also be achieved.

In some embodiments, telecommunications services platform 106 may incorporate distributed databases, clustering technologies, data analytics tools, or messaging middleware to provide a robust, scalable platform. Telecommunications services platform 106 may use virtualized components with a layered approach to service orchestration, which allows telecommunications services platform 106 to be integrated into various cloud environments, such as a carrier's private cloud infrastructure, a dedicated PTT cloud infrastructure, combinations thereof, or the like. A more detailed description of representative telecommunications services platforms may be found in commonly-assigned U.S. patent application Ser. No. 14/994,757 filed on 13 Jan. 2016, entitled "System and Method for Elastic Scaling using a Container-Based Platform," which application is hereby incorporated by reference. Other telecommunication services platforms, including other PTT platforms, may be used in other embodiments.

The traffic patterns of PTT typically have several characteristics. Group calls are common, which may require a large number of radio resources to be simultaneously used and may require significant downlink traffic compared to uplink traffic. Traffic is typically one-way, e.g., a particular speech direction (talker to one or more listeners), and there may be a clear indication of speech direction changes (via a floor control). For example, at any given point-in-time during a call, only a user with floor control speaks while the other participants (e.g., users without floor control) listen. The end-to-end call setup time can typically be of significance, and in some embodiments may need to be less than about 500 ms. The floor request ACK time may also be significant, and in some embodiments may need to be less than about 200 ms. Calls are typically shorter, but more frequent, and call setup/teardown may be performed frequently. There may be fewer silence periods between speech, and participants typically release the floor when they are not talking.

Figure 2:
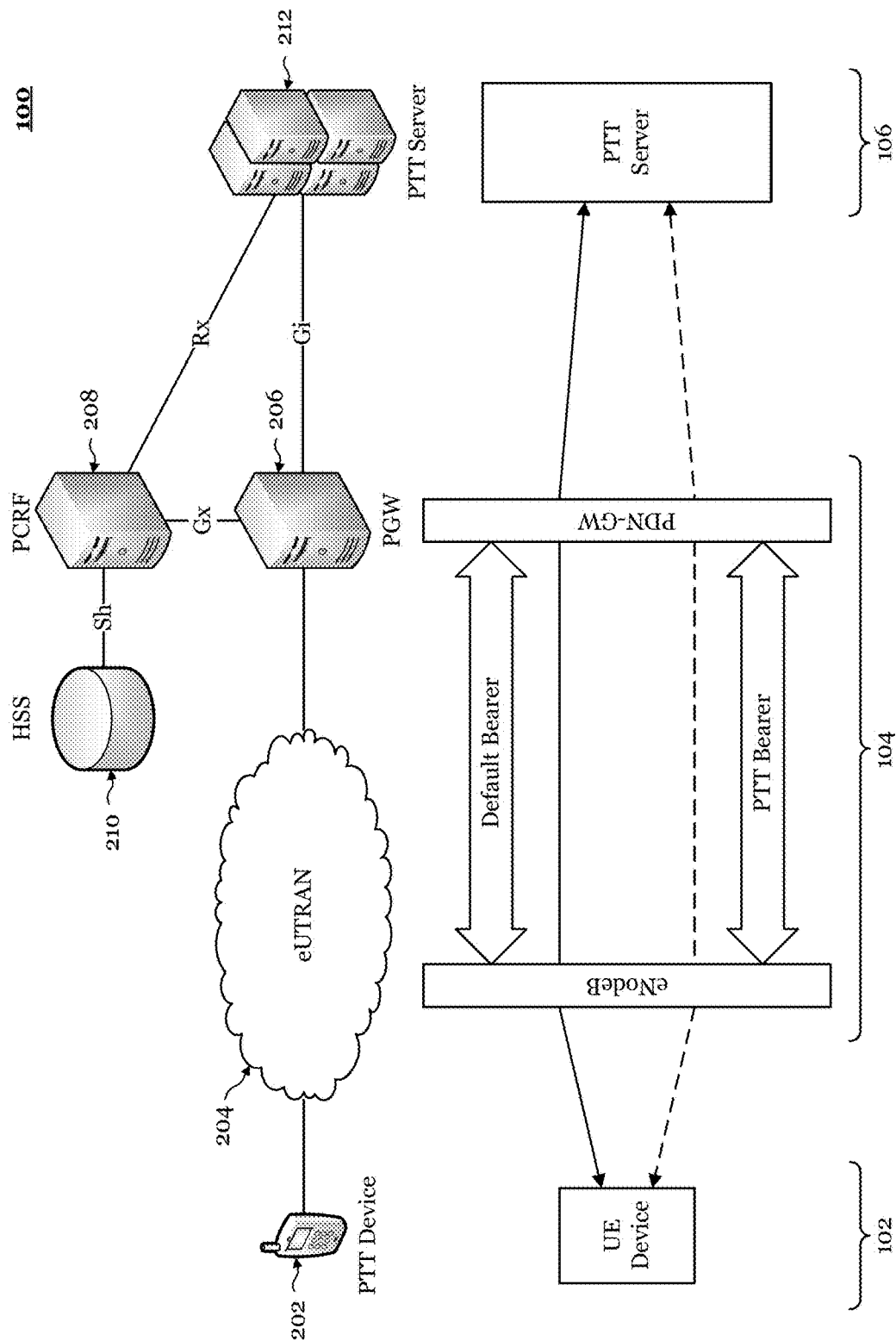
FIG. 2 is a diagram representatively illustrating a network architecture of a telecommunications system, in accordance with an embodiment.

FIG. 2 representatively illustrates a network architecture for implementing communications system 100, in accordance with some embodiments. The illustrated network architecture supports PTT, in an embodiment. UE client devices 102 include PTT device 202. PTT device 202 may include any device capable of executing PTT client software.

Communications network 104 includes a core network (CN), such as an evolved packet core (EPC) network, and eUTRAN 204. The EPC includes packet data network (PDN) gateway (PGW) 206, a policy and charging rules function (PCRF) 208, and a home subscriber server (HSS) 210. A default bearer and a PTT bearer are established by communications network 104 between eUTRAN 204 and PGW 206.

Telecommunications services platform 106 is a PTT platform and includes PTT server 212. PTT server 212 dynamically establishes a dedicated evolved packet system (EPS) bearer for the PTT bearer by configuring PCRF 208, and may do so using a standard interface, such as an Rx interface. PCRF 208 configures PGW 206 to establish a bearer using a standard interface, such as a Gx interface. During a PTT call, PCRF 208 may collect information, such as billing information, and store the information in HSS 210 using a standard interface, such as a Sh interface. It will be appreciated that PGW 106, PCRF 208, HSS 210, and PTT server 212 may also communicate using non-standard interfaces provided by a cellular network operator. In some embodiments, the PTT bearer may not be established by PTT server 212, but rather PTT server 212 may provide a QoS profile for a dedicated EPS bearer that may be, e.g., statically set by a cellular network operator. In such embodiments, dedicated EPS bearers may be employed for PTT traffic.

In some embodiments, PTT server 212 configures PGW 206 using a Gi interface. In such embodiments, PTT server 212 configures PGW 206 using a configuration protocol, such as session initiation protocol (SIP), real-time transport protocol (RTP), real-time transport control protocol (RTCP), or the like. Such communication may be exchanged over the Gi interface.

PTT server 212 may be configured to transmit and receive SIP traffic over the default bearer. Such traffic may include functions such as invitations, call setup, acknowledgement, and other messages. PTT server 212 may be further configured to transmit and receive RTP, RTCP, or media traffic during a PTT call over the PTT bearer. An eNB in eUTRAN 204 may be configured to match the traffic to a traffic flow template (TFT) configured in the eNB. The TFT may be configured using a QoS profile for PTT over LTE, which may be specified by PTT server 212. For example, the TFT configured on the eNB may be optimized for PTT with a QoS profile specifying a PDB optimized for PTT. In various representative implementations, the default bearer and PTT bearer are different and may define different parameters for communication over a respective bearer.

Figure 3A:
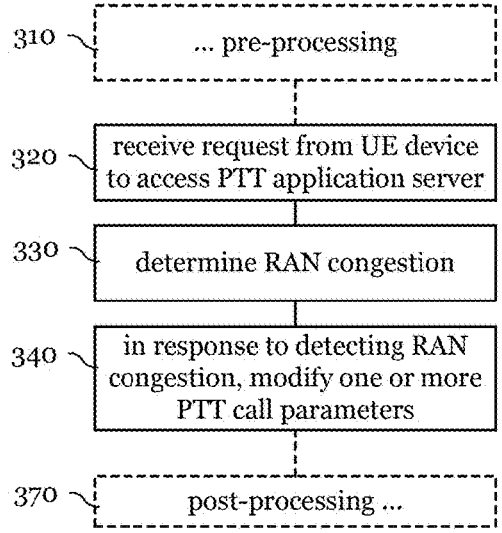
FIGS. 3A, 3B and 3C are flowcharts illustrating representative methods for improving push-to-talk (PTT) communications performance, in accordance with some embodiments.

As illustrated in FIG. 3A, a representative method 300A for improving PTT communication performance includes step 320 where PTT application server 212 receives a request from PTT device 202 (UE device/client) to access PTT application server 212. In an embodiment, method 300A illustrates steps performed by PTT application server 212. Prior to PTT application server receiving the PTT service request in step 320, PTT application server 212 may be engaged in other PTT application service processes. Step 310 indicates one or more processing steps performed by PTT application server 212 preliminary to receipt of PTT service request in step 320.

As shown in FIG. 3A, step 310 appears with dashed lines, both for depicting step 310, as well as for illustrating connection of step 310 to step 320. As used in FIGS. 3A, 3B and 3C, dashed lines indicate optional processes and optional connection between processes. Where one or more optional processes or optional steps are illustrated with dashed lines, the steps and connections to same may be optionally performed. That is to say that a process step appearing with dashed lines may or may not be performed, in accordance with some embodiments.

After step 320, PTT application server 212 provides PTT service to UE device (PTT device) 202. Provision of PTT service may include instantiation of PTT service or delivery of PTT services. Incident to engagement of PTT service, or some time thereafter (e.g., after or concurrent with delivery of PTT services), PTT application server 212 in step 330 determines radio access network (RAN) congestion for a cell servicing UE device 202. In some embodiments, evaluating RAN congestion may include obtaining location information for UE device 202 to determine, or otherwise detect, where (e.g., identification of a cell in which) UE device 202 is located within the carrier network. In a representative embodiment, a terminal identifier may be obtained for UE device 202, which may be correlated to a cell of the carrier network. In some embodiments, the terminal identifier may be obtained from the carrier network or from UE device 202.

In a representative embodiment, determination of RAN congestion may include measurement or analysis of use data for the cell currently servicing UE device 202. In an embodiment, use data may be configured to provide an indication of a cumulative amount of data provided by PTT application server 212 attendant to delivery of PTT services to UE devices within a cell servicing UE device 202 over a given period of time. In some embodiments, the volume of data may correspond to data trafficked to or from UE devices within the subject cell over the subject time period. For example, the data volume may alternatively or conjunctively indicate data traffic to or from UE device 202 in combination with all or some portion of other PTT subscriber UE devices co-located in the subject cell.

In yet other embodiments, the indication of data volume may alternatively or conjunctively correspond to data exchanged among or between one or more subscribed UE devices (including or excluding UE device 202) within the subject cell for the subject time period. In some embodiments, the subject period of time may be temporally proximate the request for PTT service in step 320.

In other embodiments, the period of time may correspond to historical volume data for the subject cell, and may or may not be temporally proximate the request for PTT service in step 320. For example, historical volume data may be assembled or otherwise organized for analysis or evaluation to correlate PTT use in a subject cell with month of year, week of month, day of week, time of day, whether the day (or time of day) corresponds to a day (or time of day) when business activities are typically conducted, or the like.

In some embodiments, historical use data may be evaluated with numerical or heuristic models to determine whether UE device 202 may be characterized as, or is susceptible to, experiencing congestion. In a representative embodiment, heuristic analysis of historical use data may provide a threshold congestion criterion, which when exceeded, indicates that the subject cell is experiencing, or is susceptible to experience, congestion.

Skilled artisans will appreciate that there are other means of measuring, determining, or detecting congestion in a cell of a carrier network. Accordingly, representative embodiments described herein are not limited to only the recited methods of measuring, determining, or detecting network congestion. Any method or means of characterizing network congestion, whether now known or hereafter derived, may be alternatively, conjunctively, or sequentially employed, in accordance with various other embodiments.

In step 340, responsive to a network congestion threshold criterion being exceeded, PTT application server 212 may be configured to modify one or more PTT call parameters. In accordance with some embodiments, representative PTT call parameters may include, e.g., selection of a coder-decoder (or compression-decompression, "codec") protocol used to encode/decode PTT voice data, a frequency (number per time) of acknowledgement signal transmissions, whether or how frame bundling or multiplexing is performed, or the like.

In a representative aspect, UE device may use a first codec with a first data rate (or first bit rate) to encode/decode PTT voice data: e.g., Advanced Multi-Rate (AMR) 4.75 kbps, AMR 50.15 kbps, AMR 5.9 kbps, AMR 6.7 kbps, AMR 7.4 kbps, AMR 10.2 kbps, AMR 12.2 kbps, AMR WB 6.6 kbps, AMR WB 8.85 kbps, AMR WB 12.65 kbps, AMR WB 14.25 kbps, AMR WB 15.85 kbps, AMR WB 18.25 kbps, Opus 18 kbps, Opus 7 kbps, AMBE/IMBE 30.6 kbps, or the like. In an embodiment responsive to detection of RAN congestion, PTT application server 212 may transmit a codec-selection parameter to UE device 202 indicating that a second bit rate second codec (e.g., Improved Multi-Band Excitation (IMBE)/Advanced Multi-Band Excitation (AMBE) 2.69 kbps) is to be used for encoding/decoding PTT voice data. In an embodiment, the second bit rate may be lower than the first bit rate. UE device 202 receives the parameter for codec selection (e.g., second codec: IMBE/AMBE 2.69 kbps) and begins using the second codec to communicate with other PTT UE devices over the carrier network, thereby reducing data load on the cell in which UE device 202 is located.

It will also be appreciated that various representative embodiments may be configured to address circumstances where data traffic on the carrier network is not currently congested, or a network congestion threshold criterion is not or has not yet been exceeded. For example, the PTT application server may engage congestion reduction methods attendant to expected congestion or a probability of emergent congestion (e.g., for group calls, broadcast calls, or the like).

In a representative example, the PTT application server may have LTE deployment information (for example, spectrum size—e.g., 5 MHz, 1.4 MHz, or the like) and be configured to limit a percentage of LTE data bandwidth in allocation of PTT data traffic in order to prioritize LTE data bandwidth for LTE voice data. The PTT application server may be aware of a number of PTT users in a particular LTE cell (e.g., woo PTT UE devices in a subject cell). In a representative configuration, the PTT server may be permitted or otherwise allocated use of up to 60% of LTE bandwidth for aggregate data traffic. If the PTT server fields a group PTT call service request involving 500 UE devices of the subject LTE cell where all 500 UE devices are using a default codec (e.g., AMR 12.2 kbps) and a default frame rate (e.g., 7), servicing the resulting PTT call would likely cause congestion in the subject cell. Based on a prediction of likely congestion attendant to servicing the PTT call request, the PTT server may be configured to adjust the codec data rate, the codec type, frames per packet, or the like, to deliver PTT data to PTT group participants while avoiding or otherwise reducing congestion produced attendant to servicing the PTT call request. In a representative example, the PTT application server may choose AMBE 3.6 kbps as a codec at 14 frames per packet (e.g., with packets delivered 14×20 ms=280 ms, instead of default intervals of 7×20 ms=140 ms). In such embodiments, frame bundling protocols using larger or smaller data bundles (e.g., a fewer or greater number of frames per packet) may be employed to reduce data load on a cell in which UE device 202 is located.

Accordingly, PTT call optimization may involve not only selection of appropriate codec types and codec rates, but also frames per packet. In accordance with representative embodiments and aspects, the PTT application may be configured to vary PTT call parameters (e.g., codec type, codec rate, frame rate, or the like) for different sets of users within a PTT call. For example, a PTT group call may involve PTT users in multiple LTE cells, with actual or likely congestion for each of these cells being different.

In an alternative or conjunctive embodiment, another PTT call parameter may correspond to a number of acknowledgement signals that PTT application server 212 transmits to UE device 202. In such embodiments responsive to detection/prediction of network congestion, the number of acknowledgement signals may be reduced, thereby decreasing data load on the cell in which UE device 202 is serviced.

In a representative embodiment, acknowledgement signals from UE devices may be staggered. PTT application server 212 may provide a PTT call parameter to UE device 202 indicating when (or whether) UE device 202 may be expected to provide an acknowledgement signal. For example, PTT application server 212 may provide an acknowledgement timer as a parameter of multi-band connection protocol (MBCP) connect during initial service provisioning of UE devices 202. A set or subset of PTT users may be provided with different acknowledgement timer values such that acknowledgement signals are sent after expiration of assigned timer values in a staggered sequence in time. For example, a first set or subset of PTT users may be provided with a first acknowledgment timer value, and a second set or subset of PTT users may be provided with a second acknowledgment timer value different than (e.g., less than or greater than) the first acknowledgment timer value. By providing different acknowledgment timer values, the first set or subset of PTT users may transmit ACK messages at a different time (e.g., prior to or after) than the second set or subset of PTT users. In a representative aspect, different acknowledgement timer values may be assigned to different PTT users within a PTT call group or located in a same cell. In another embodiment, acknowledgement signals for plural messages may be sent separately or substantially combined after expiration of an assigned acknowledgement timer value. In another embodiment, acknowledgement signaling may be suspended or turned off for a broadcast or group call session. A representative benefit of reducing acknowledgement data traffic includes, e.g., reducing network uplink congestion by reducing a number of PTT UE devices attempting to send uplink messages at a substantially same time. Another representative benefit includes reducing instances of UE devices requesting network uplink data resources to send acknowledgement signals, which would otherwise produce or add to network congestion.

Skilled artisans will appreciate that there are other types of PTT call parameters that may be modified responsive to detection/prediction of network congestion. Accordingly, representative embodiments described herein are not limited to only the recited PTT call parameters. Any PTT call parameter, whether currently employed or hereafter derived, may be alternatively, conjunctively, or sequentially used, in accordance with various other embodiments.

As representatively illustrated in FIG. 3A, method 300A may be preceded by one or more optional pre-processing steps (pre-processing 310), or may be followed by one or more optional post-processing steps (post-processing 370).

Figure 3B:
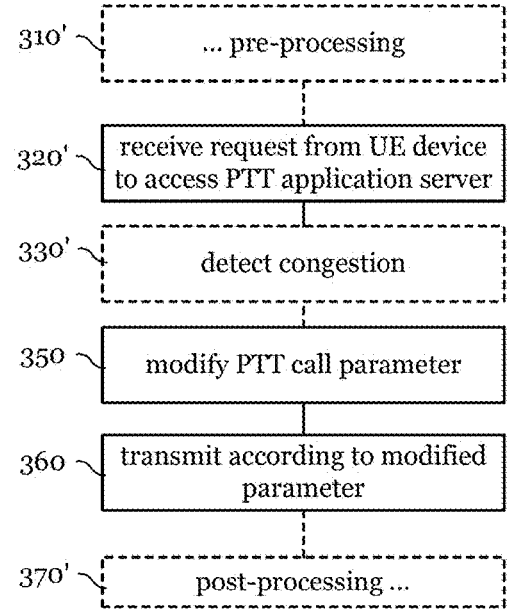

As representatively illustrated in FIG. 3B, another method 300B for improving PTT communication performance includes step 320' where PTT application server 212 receives a request from UE device 212 to access PTT application server 212 for participation in PTT service over carrier network 204. In an embodiment, method 300B illustrates steps performed by PTT application server 212. Prior to PTT application server receiving PTT service request in step 320', PTT application server 212 may be engaged in processing steps preliminary to receipt of PTT service requests. Step 310' indicates such one or more processing steps performed by PTT application server 212 preliminary to receipt of PTT service request in step 320'.

Thereafter, PTT application server 212 in step 330' optionally measures, determines, or otherwise detects network congestion for a cell servicing UE device 202. Detection of network congestion may proceed in substantial correspondence to determination of RAN congestion in step 330 of FIG. 3A, and as previously described.

In step 350, and in optional response to detection of network congestion in step 330', PTT application server 212 modifies one or more PTT call parameters. In a representative embodiment, PTT application server 212 may transmit a codec-selection parameter to UE device 202 indicating that a lower data rate codec (e.g., IMBE/AMBE 2.69 kbps) is to be used by UE device 202 to encode/decode PTT voice data. In a representative aspect, the selected codec will have a lower bit rate than that used by UE device 202 at least immediately prior to modification of, e.g., the codec selection parameter in step 350.

In an alternative or conjunctive embodiment, a different PTT call parameter may correspond to a number of acknowledgement signals that PTT application server 212 transmits to UE device 202. In such embodiments (optionally responsive to detection of network congestion), the number of acknowledgement signals may be reduced by PTT application server 212 transmitting in accordance with the modified PTT call parameter (e.g., a reduced number of acknowledgement signals) in step 360, thereby decreasing data load on the cell in which UE device 202 is serviced.

In yet another alternative or conjunctive embodiment, another PTT call parameter may correspond to selection of a frame bundling protocol used to package data for delivery over carrier network. In such embodiments, PTT application server 212 may transmit larger or smaller data bundles in accordance with the modified PTT call parameter (e.g., a frame bundling protocol) in step 360 to reduce data load on the cell in which UE device 202 is located.

Skilled artisans will appreciate that PTT application server 212 may transmit in accordance with other types and other modifications of PTT call parameters. Accordingly, representative embodiments described herein are not limited to only the recited PTT call parameters and modifications thereof. Any PTT call parameter and modification thereof, whether currently employed or hereafter derived, may be alternatively, conjunctively, or sequentially used, in accordance with various other embodiments.

As representatively illustrated in FIG. 3B, method 300B may be preceded by one or more optional pre-processing steps (workflow element 310'), or may be followed by one or more optional post-processing steps (workflow element 370').

Figure 3C:
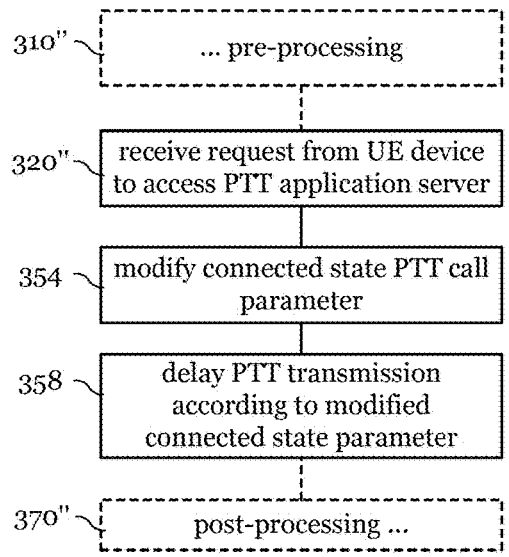

As representatively illustrated in FIG. 3C, another method 300C for improving PTT communication performance includes step 320" where PTT application server 212 receives a request from UE device 212 to access PTT application server 212 for participation in PTT service over carrier network 204. In an embodiment, method 300C illustrates steps performed by PTT application server 212. Prior to PTT application server receiving PTT service request in step 320", PTT application server 212 may be engaged in processing steps preliminary to receipt of PTT service requests. Step 310" indicates such one or more processing steps performed by PTT application server 212 preliminary to receipt of PTT service request in step 320".

In step 354, in optional response to detection of network congestion, PTT application server 212 modifies one or more PTT call parameters; e.g., a connected state parameter. In a representative embodiment, PTT application server 212 may transmit a connected state parameter to UE device 202 indicating that UE device 202 is not to be instantiated in a connected state with PTT application server 212 or other UE devices until a designated period of time has transpired or a trigger is received. In such an embodiment (optionally responsive to detection of network congestion), PTT transmissions are delayed (step 358) in accordance with the modified connected state parameter, thereby decreasing data load on the cell in which UE device 202 is serviced. In a representative aspect, PTT data communication to UE device 202 is not delivered in real-time, but instead is delayed (e.g., until the expiration of a configured timer) or is piggy-backed on other PTT traffic. Accordingly, UE device 202 may be kept in an idle state, instead of waking up for each message. An added benefit of such embodiments is that UE device 202 battery usage may be improved. Other examples of throttling or reduction of data overhead include lengthening the periodicity of SIP register refreshes, presence status change notifications, group data change notifications, combinations thereof, or the like.

As representatively illustrated in FIG. 3C, method 300C may be preceded by one or more optional pre-processing steps (workflow element 310"), or may be followed by one or more optional post-processing steps (workflow element 370").

Figure 4:
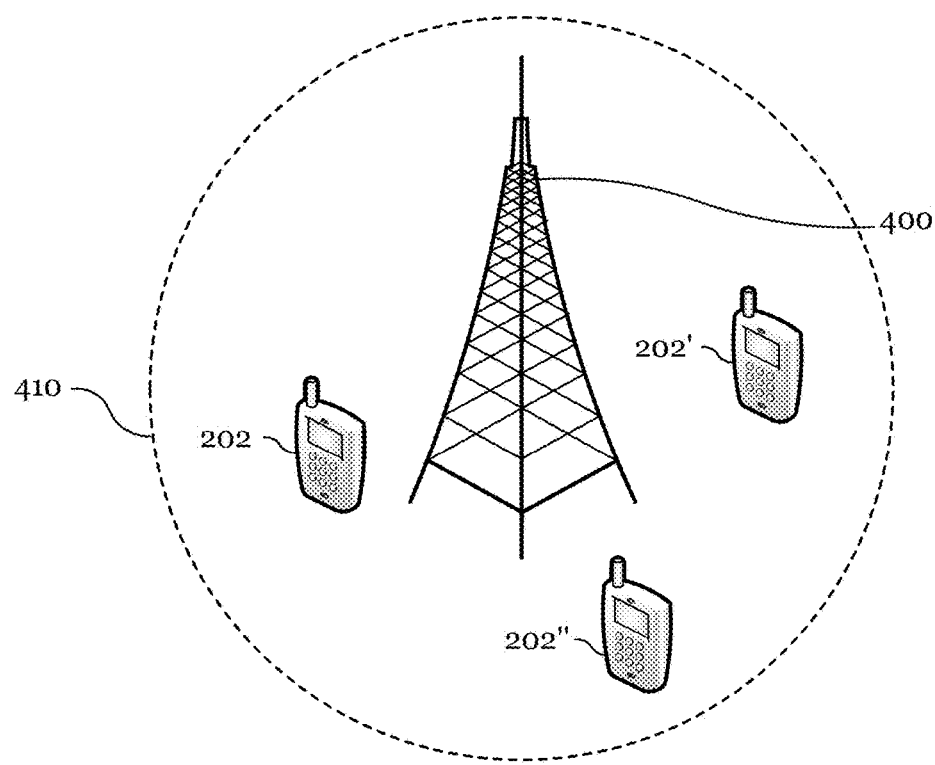
FIG. 4 is a diagram representatively illustrating base station PTT service coverage for plural PTT client devices.

FIG. 4 representatively illustrates a base station 400 servicing UE devices 202, 202', 202" with PTT functionality in an area of PTT service coverage (cell 410) for base station 400.

Figure 5:
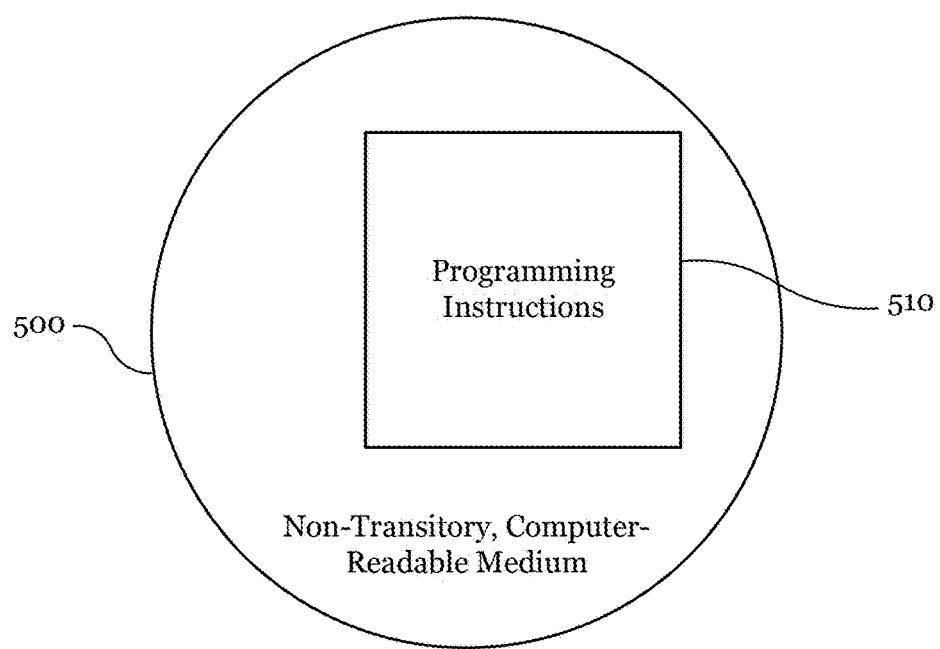
FIG. 5 is a diagram representatively illustrating programming instructions stored on a non-transitory, computer-readable medium, in accordance with an embodiment.

FIG. 5 representatively illustrates programming instructions 510 stored on non-transitory, computer-readable medium 500. ROM, RAM, and HD comprise representative means for storing computer-executable instructions 510 executable by the CPU, or capable of being complied or interpreted to be executable by the CPU. As used herein, the term "computer-readable medium" is not limited to ROM, RAM, and HD, and can include any type of data storage medium, whether now known or hereafter described in the art, which can be read by a processor. For example, a computer-readable medium may refer to a data cartridge, a data backup magnetic tape, a floppy diskette, a flash memory drive, an optical data storage drive, a compact disk read only memory ("CD-ROM"), ROM, RAM, HDD, or the like. The processes described herein may be implemented in suitable computer-executable instructions that may reside on computer-readable medium 400 (for example, a disk, CD-ROM, a memory, etc.). Alternatively or conjunctively, computer-executable instructions 510 may be stored as software code components on a direct access storage device ("DASD") array, magnetic tape, floppy diskette, optical storage device, or other appropriate computer-readable medium or storage device.

In a representative embodiment, computer-executable instructions 510 may comprise lines of C++, Java, JavaScript, hypertext markup language ("HTML"), or any other programming or scripting code. Other software/hardware/network architectures may be used. For example, various functions may be implemented on one computer or shared among two or more computers. In one embodiment, functions may be distributed in a network. Communications between computers may be accomplished using any electronic, optical, radio frequency signals, or other suitable methods or tools of communication in compliance with given network protocols.

Figure 6:
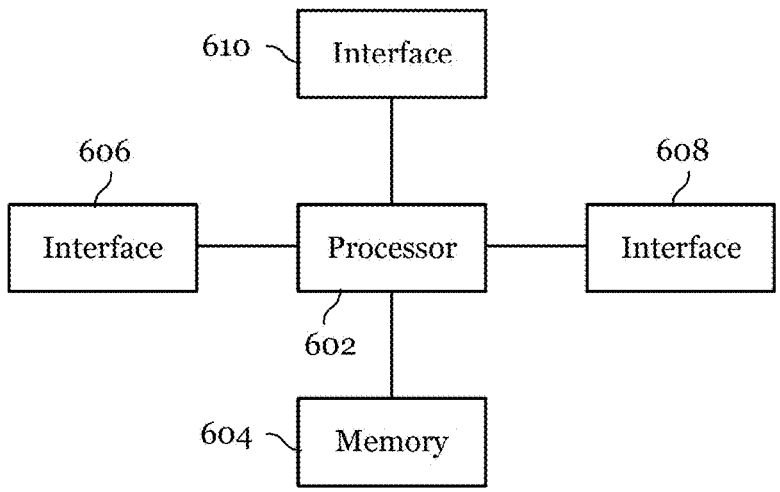
FIG. 6 is a diagram representatively illustrating an application server processing system, in accordance with an embodiment.

FIG. 6 representatively illustrates processing system 600 for performing methods described herein, which may be installed to a host device. As shown, processing system 600 includes a processor 602, a memory 604, and interfaces 606, 608, 610, which may (or may not) be arranged as shown in FIG. 6. Processor 602 may be any component or collection of components suitably adapted to perform computations or other processing related tasks. Memory 604 may be any component or collection of components suitably adapted to store programming or instructions for execution by processor 602. In a representative embodiment, memory 604 comprises a non-transitory, computer-readable medium. Interfaces 606, 608, 610 may be any component or collection of components that allow processing system 600 to communicate with other devices/components or a user. For example, one or more of interfaces 606, 608, 610 may be suitably configured to communicate data, control, or management messages from processor 602 to applications installed on the host device or a remote device. By way of further example, one or more interfaces 606, 608, 610 may be adapted to allow a user or user device (e.g., personal computer (PC), etc.) to interact/communicate with processing system 600. Processing system 600 may include additional components not illustrated in FIG. 6, such as long term storage (e.g., non-volatile memory, or the like).

In some embodiments, processing system 600 may be a component of a network device accessing, or otherwise part of, a telecommunications network. For example, processing system 600 may be disposed in a network-side device in a wireless or wireline telecommunications network, such as a base station, a relay station, a scheduler, a controller, a gateway, a router, an applications server, or any other device in the telecommunications network. In other embodiments, processing system 600 may be disposed in a user-facing device accessing a wireless or wireline telecommunications network, such as a mobile station, a UE device, a PC, a tablet, a wearable communications device (e.g., a smartwatch, etc.), or any other device adapted to access a telecommunications network.

Figure 7:
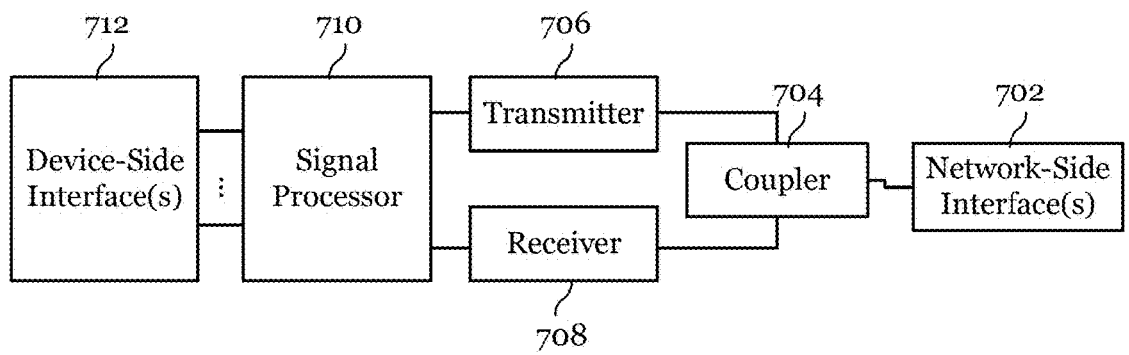
FIG. 7 is a diagram representatively illustrating a telecommunications transceiver, in accordance with an embodiment.

FIG. 7 is a block diagram of transceiver 700 adapted to transmit and receive signaling over a telecommunications network. In some embodiments, one or more of interfaces 606, 608, bio connects processing system 600 to a transceiver adapted to transmit and receive signaling over the telecommunications network. Transceiver 700 may be installed in a host device. As representatively illustrated, transceiver 700 may comprise a network-side interface 702, a coupler 704, a transmitter 706, a receiver 708, a signal processor 710, and a device-side interface 712. Network-side interface 702 may include any component or collection of components suitably adapted to transmit or receive signaling over a wireless or wireline telecommunications network. Coupler 704 may include any component or collection of components adapted to facilitate bi-directional communication over network-side interface 702. Transmitter 706 may include any component or collection of components (e.g., up-converter, power amplifier, or the like) adapted to convert a baseband signal into a modulated carrier signal suitable for transmission over network-side interface 702. Receiver 708 may include any component or collection of components (e.g., down-converter, low noise amplifier, etc.) adapted to convert a carrier signal received over network-side interface 702 into a baseband signal. Signal processor 710 may include any component or collection of components adapted to convert a baseband signal into a data signal suitable for communication over device-side interface(s) 712, or vice versa. Device-side interface(s) 712 may include any component or collection of components suitably configured to communicate data signals between signal processor 710 and components within the host device (e.g., processing system 600, local area network (LAN) ports, or the like).

Transceiver 700 may transmit and receive signaling over any type of communications medium. In some embodiments, transceiver 700 transmits and receives signaling over a wireless medium. For example, transceiver 700 may be a wireless transceiver adapted to communicate in accordance with a wireless telecommunications protocol, such as a cellular protocol (e.g., long-term evolution (LTE), or the like), a wireless local area network (WLAN) protocol (e.g., Wi-Fi, or the like), or any other type of wireless protocol (e.g., Bluetooth, near field communication (NFC), or the like). In such embodiments, network-side interface 702 may comprise one or more antenna/radiating elements. For example, network-side interface 702 may include a single antenna, multiple separate antennas, or a multi-antenna array configured for multi-layer communication; e.g., single input multiple output (SIMO), multiple input single output (MISO), multiple input multiple output (MIMO), or the like. In other embodiments, transceiver 700 transmits and receives signals or messages over a wireline medium; e.g., twisted-pair cable, coaxial cable, optical fiber, or the like. Specific processing systems and/or transceivers may utilize all of the components shown or only a subset of the components, and levels of integration may vary from device to device.

In a representative embodiment, a PTT application server configured to provide improved PTT communication performance includes one or more processors and a non-transitory, computer-readable medium storing programming executable by the one or more processors. The programming includes instructions to: receive a request from a user equipment (UE) device to access the PTT application server; detect radio access network (RAN) congestion and, in response to detecting RAN congestion, modify one or more PTT call parameters. The PTT application server then transmits, according to the modified one or more PTT call parameters, to the UE device. Transmitting according to the modified one or more PTT call parameters may include reducing a number of signals transmitted to the UE device. Signals transmitted to the UE device may include acknowledgement signals or retry packets. The one or more PTT call parameters may comprise a codec selection, connected state instantiation, or a frame bundling protocol. Modifying the codec selection may comprise selecting a lower data rate codec. The lower data rate codec may be AMBE/IMBE 2.69 kbps. The lower data rate codec may comprise Codec-2 with a bit rate between about 0.7 kbps and about 3.2 kbps.

In another representative embodiment, a method for improving PTT communication performance includes steps of: receiving, by a PTT application server, a request from a UE device to access the PTT application server; determining, by the PTT application server, RAN congestion in a carrier network connecting the UE device to the PTT application server; and, in response to detecting RAN congestion, the PTT application server, modifying one or more PTT call parameters, transmitting the modified one or more PTT call parameters to the UE device, and transmitting fewer signals to the UE device. Determining RAN congestion may further comprise using location information for the UE device and use data for a cell in which the UE device is located. Location information for the UE device may be determined from a terminal identifier for the UE device. Use data for the cell may be accessed from a data store external to the PTT application server. Transmitting fewer signals to the UE device may comprise reducing a number of transmitted acknowledgement signals. A target value for the number of transmitted acknowledgement signals may be determined based on heuristic analysis of historical RAN congestion for the cell. Transmitting fewer signals to the UE device may comprise frame bundling (e.g., RTP frame bundling). A target value for frame bundling may be determined based on heuristic analysis of a RAN congestion history for the cell. Modifying one or more PTT call parameters may comprise selecting a lower data rate codec. The lower data rate codec may be selected based on heuristic analysis of RAN congestion for the cell.

In yet another representative embodiment, a method for improving PTT communication performance includes steps of: receiving, by a push-to-talk (PTT) application server, PTT call data from a first user equipment (UE) device, the PTT call data encoded with a first codec, the first codec having a first data rate; the PTT application server transmitting a codec call parameter to the first UE device, the codec call parameter comprising a second codec having a second data rate, the second data rate less than the first data rate; and after transmitting the codec call parameter to the first UE device, receiving, by the PTT application server, PTT call data from the first UE device encoded with the second codec. The method may further comprise detecting a measure of congestion for a cell in which the UE device is located, the measure of congestion corresponding to actual congestion or predicted congestion. Determining the measure of congestion may comprise using location information for the UE device and use data for the cell. The method may further comprise, in response to detecting congestion in the cell, transmitting the codec call parameter to the UE device. The method may further comprise a step of, in response to detecting congestion in the cell, transmitting fewer signals to the UE device. Transmitting fewer signals to the UE device may comprise at least one of reducing a number of transmitted acknowledgement signals, or frame bundling. The method may further comprise the PTT application server delaying transmission of PTT data to the first UE device, or piggy-backing PTT data for the first UE device on PTT traffic transmitted to a second UE device.

As used herein, the terms "comprises," "comprising," "includes," "including," "has," "having," or any contextual variant thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

As used herein, the terms "determining," "determination," "detecting," "detection," "detector," "predicting," "prediction," or contextual variants thereof, refer to functions and/or device components that assign or otherwise provide an output value for at least one of a direct measurement, an in-direct measurement, or a computed measurement. For example, a determination or detection of an angle between two lines may comprise a direct measurement of the angle between the lines, an indirect measurement of the angle (e.g., as in the case of extending the length of two non-parallel lines outside the area of observation so as to predict their angle of intersection), or a computed measurement (e.g., using trigonometric functions to calculate an angle). Accordingly, "determining" the angle of intersection may be regarded as equivalent to "detecting" the angle of intersection, and a "detector" for determining the angle may be regarded as directly measuring, indirectly measuring, or computing the angle between the lines.

Representative embodiments of the disclosure may be implemented in a computer communicatively coupled to a network. The network may include, for example, the Internet, an intranet, an internet, a wide area network (WAN), a local area network (LAN), a storage area network (SAN), a personal area network (PAN), another computer, a stand-alone computer, or the like. As is known to those skilled in the art, a computer can include a central processing unit ("CPU") or processor, at least one read-only memory ("ROM"), at least one random access memory ("RAM"), at least one hard disc drive ("HDD"), and one or more input/output ("I/O") device(s). I/O devices may include a keyboard, monitor, printer, electronic pointing device (e.g., mouse, trackball, stylus, etc.), or the like. In various embodiments, a server computer may have access to at least one database over a network. The database may be local or remote to the server computer.

Additionally, representative functions may be implemented on one computer or shared/distributed among two or more computers in or across a network. Communications between computers may be accomplished using any electronic, optical, radio frequency signals, or other suitable methods and tools of communication in compliance with network protocols now known or otherwise hereafter derived. It will be understood for purposes of this disclosure that an application service may comprise one or more computer processes, computing devices or both, configured to perform one or more functions. An application service may present one or more interfaces that can be utilized to access these functions. Such interfaces include application programming interfaces (APIs), interfaces presented for web services, remote procedure calls, remote method invocation, or the like.

Any suitable programming language(s) can be used to implement the routines, methods or programs of embodiments described herein, including; e.g., C, C#, C++, Java, Ruby, assembly language, or the like. Different programming techniques may be employed, such as procedural or object oriented ontologies. Any particular routine can execute on a single computer processing device or multiple computer processing devices, a single computer processor, or multiple computer processors. Data may be stored in a single storage medium or distributed across multiple storage mediums, and may reside in a single database or multiple databases (or other data storage techniques).

Although steps, operations, or computations may be presented in a specific order, this order may be changed in different embodiments. In some embodiments, to the extent multiple steps are shown as sequential in the preceding description, some combination of such steps in alternative embodiments may be performed at the same time. The sequence of operations described herein may be interrupted, suspended, or otherwise controlled by another process, such as an operating system, kernel, daemon or the like. The routines can operate in an operating system environment or as stand-alone routines. Functions, routines, methods, steps and operations described herein can be performed in hardware, software, firmware, or any combination thereof.

Embodiments described herein may be implemented in the form of control logic in software or hardware, or a combination of both. The control logic may be stored in an information storage medium, such as a computer-readable medium, as a plurality of instructions adapted to direct an information processing device to perform a set of steps disclosed in various embodiments. Based on the disclosure and teachings provided herein, a person of ordinary skill in the art will appreciate other ways or methods to implement similar, or substantially similar, functionality.

It is also within the spirit and scope herein to implement, in software, programming, or other steps, operations, methods, routines, or portions thereof described herein, where such software programming or code can be stored in a computer-readable medium and can be operated on by a processor to permit a computer to perform any of the steps, operations, methods, routines, or portions thereof described herein. Embodiments may be implemented using software programming or code in one or more general purpose digital computers, by using, e.g., application specific integrated circuits (ASICs), programmable logic devices, field programmable gate arrays (FPGAs), or optical, chemical, biological, quantum, or nano-engineered systems, components or mechanisms. In general, functions disclosed herein may be achieved by any means, whether now known or hereafter derived in the art. For example, distributed or networked systems, components, or circuits can be used. In another example, communication or transfer (or otherwise moving from one place to another) of data may be wired, wireless, or accomplished by any other means.

A "computer-readable medium" may be any medium that can contain, store, communicate, propagate, or transport the program for use by or in connection with the instruction execution system, apparatus, system, or device. The computer-readable medium can be, but is not limited to, an electronic, magnetic, optical, electromagnetic, infrared, or semiconductor system, apparatus, system, device, propagation medium, or computer memory. Such computer-readable medium will generally be machine readable and include software programming or code susceptible of being human readable (e.g., source code) or machine readable (e.g., object code).

A "processor" includes any hardware system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different (or the same) times and at different (or the same) locations by different (or the same) processing systems.

It will also be appreciated that one or more elements depicted in the Figures may also be implemented in a more-separated or more-integrated manner, or even removed or rendered inoperable in certain cases, as may be useful in accordance with particular applications and embodiments. Additionally, any signal arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially the same result in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A push-to-talk (PTT) application server comprising:
one or more processors; and
a non-transitory, computer-readable medium storing programming executable by the one or more processors, the programming comprising instructions to:
receive a request from a user equipment (UE) device to access the PTT application server;
detect radio access network (RAN) congestion, and in response to detecting RAN congestion:
modify one or more PTT call parameters; and
transmit according to the modified one or more PTT call parameters to the UE device, wherein the modified one or more PTT call parameters comprises reducing a number of signals transmitted to the UE device.

2. The PTT application server of claim 1, wherein signals transmitted to the UE device comprise at least one of acknowledgement signals or retry packets.

3. The PTT application server of claim 1, wherein the one or more PTT call parameters comprise at least one of a codec selection, connected state instantiation, or a frame bundling protocol.

4. The PTT application server of claim 3, wherein modifying the codec selection comprises selecting a lower data rate codec.

5. The PTT application server of claim 4, wherein the lower data rate codec comprises AMBE/IMBE 2.69 kbps.

6. The PTT application server of claim 4, wherein the lower data rate codec comprises Codec-2 with a bit rate between about 0.7 kbps and about 3.2 kbps.

7. A method comprising:
receiving, by a push-to-talk (PTT) application server, a request from a user equipment (UE) device to access the PTT application server;
determining, by the PTT application server, radio access network (RAN) congestion in a carrier network connecting the UE device to the PTT application server; and
in response to detecting RAN congestion, the PTT application server:
modifying one or more PTT call parameters based on an analysis of RAN congestion;
transmitting the modified one or more PTT call parameters to the UE device; and
transmitting fewer signals to the UE device based on the modified one or more PTT call parameters.

8. The method of claim 7, wherein determining RAN congestion further comprises using location information for the UE device and use data for a cell in which the UE device is located.

9. The method of claim 8, wherein location information for the UE device is determined from a terminal identifier for the UE device.

10. The method of claim 8, wherein use data for the cell is accessed from a data store external to the PTT application server.

11. The method of claim 8, wherein transmitting fewer signals to the UE device comprises reducing a number of transmitted acknowledgement signals.

12. The method of claim 11, wherein the analysis of RAN congestion comprises heuristic analysis of RAN congestion for the cell, and a target value for the number of transmitted acknowledgement signals is determined based on the analysis of RAN congestion.

13. The method of claim 8, wherein transmitting fewer signals to the UE device comprises frame bundling.

14. The method of claim 13, wherein a target value for frame bundling is determined based on heuristic analysis of RAN congestion for the cell.

15. The method of claim 8, wherein modifying one or more PTT call parameters comprises selecting a lower data rate codec.

16. The method of claim 15, wherein the lower data rate codec is selected based on heuristic analysis of RAN congestion for the cell.

17. A method comprising:
receiving, by a push-to-talk (PTT) application server, PTT call data from a first user equipment (UE) device, the PTT call data encoded with a first codec, the first codec having a first data rate;
the PTT application server transmitting a codec call parameter to the first UE device, the codec call parameter comprising a second codec having a second data rate, the second data rate less than the first data rate; and
after transmitting the codec call parameter to the first UE device, receiving, by the PTT application server, PTT call data from the first UE device encoded with the second codec.

18. The method of claim 17, further comprising detecting a measure of congestion for a cell in which the UE device is located, the measure of congestion corresponding to actual congestion or predicted congestion.

19. The method of claim 18, wherein detecting the measure of congestion comprises using location information for the UE device and use data for the cell.

20. The method of claim 19, further comprising, in response to detecting congestion in the cell, transmitting the codec call parameter to the UE device.

21. The method of claim 19, further comprising, in response to detecting congestion in the cell, transmitting fewer signals to the UE device.

22. The method of claim 21, wherein transmitting fewer signals to the UE device comprises at least one of:
reducing a number of transmitted acknowledgement signals; or
frame bundling.

23. The method of claim 17, further comprising the PTT application server:
delaying transmission of PTT data to the first UE device; or
piggy-backing PTT data for the first UE device on PTT traffic transmitted to a second UE device.

* * * * *